US011527170B2

(12) United States Patent
Smith et al.

(10) Patent No.: US 11,527,170 B2
(45) Date of Patent: Dec. 13, 2022

(54) SYSTEM OF LANGUAGE LEARNING WITH AUGMENTED REALITY

(71) Applicant: UNIVERSITY OF SOUTH FLORIDA, Tampa, FL (US)

(72) Inventors: Sara Ashley Smith, Tampa, FL (US); Maria Soledad Carlo, Tampa, FL (US); Sanghoon Park, Tampa, FL (US); Howard Kaplan, Tampa, FL (US)

(73) Assignee: University of South Florida, Tampa, FL (US)

( * ) Notice: Subject to any disclaimer, the term of this patent is extended or adjusted under 35 U.S.C. 154(b) by 424 days.

(21) Appl. No.: 16/826,887

(22) Filed: Mar. 23, 2020

(65) Prior Publication Data

US 2020/0302815 A1 Sep. 24, 2020

Related U.S. Application Data

(60) Provisional application No. 62/822,125, filed on Mar. 22, 2019.

(51) Int. Cl.
*G06T 19/00* (2011.01)
*G09B 5/06* (2006.01)
(Continued)

(52) U.S. Cl.
CPC ............ *G09B 5/065* (2013.01); *G06F 3/167* (2013.01); *G06K 7/10722* (2013.01);
(Continued)

(58) Field of Classification Search
None
See application file for complete search history.

(56) References Cited

U.S. PATENT DOCUMENTS

2017/0017642 A1* 1/2017 Cunningham ..... G02B 27/0172
2019/0311640 A1* 10/2019 Merwin ................... G09B 5/06

OTHER PUBLICATIONS

Atkinson, R. K. (2002). Optimizing learning from examples using animated pedagogical agents. Journal of Educational Psychology, 94(2), 416.

(Continued)

*Primary Examiner* — Yanna Wu
(74) *Attorney, Agent, or Firm* — Meunier Carlin & Curfman, LLC

(57) ABSTRACT

Education curricula materials include encoded indicia such as a QR code that contains information related to identifying requested augmented reality image data from a server over a network. By scanning the QR code, a computer uses its decoding software to create a data set for transmitting to the server. The data set may include an identifier for selected augmented reality image data associated with the user's curriculum, information about the curriculum at issue, the academic level of the user, and any other data necessary to ensure that the most appropriate augmented reality image data is transmitted back to the computer. The server transmits comprehensive augmented reality image data back to the computer for viewing on a computerized display accessible by a student. Part of the content may include an interactive pedagogical agent that helps the student with a part of the instruction related to a portion of the curriculum.

14 Claims, 4 Drawing Sheets

(51) Int. Cl.
   G06F 3/16     (2006.01)
   G06K 7/14     (2006.01)
   G06K 7/10     (2006.01)
   G09B 19/06    (2006.01)
   H04N 5/232    (2006.01)

(52) U.S. Cl.
   CPC .......... *G06K 7/1417* (2013.01); *G06T 19/006* (2013.01); *G09B 19/06* (2013.01); *H04N 5/232* (2013.01); *G06T 2200/24* (2013.01)

(56) References Cited

OTHER PUBLICATIONS

August, D. & Shanahan, T. (2006). Developing literacy in second-language learners: Report of the National Literacy Panel on Language-Minority Children and Youth. Mahwah, NJ, US: Lawrence Erlbaum Associates Publishers.

Azuma, R., Baillot, Y., Behringer, R., Feiner, S., Julier, S., & MacIntyre, B. (2001). Recent advances in augmented reality. IEEE computer graphics and applications, 21(6), 34-47.

Barreira, J., Bessa, M., Pereira, L. C., Adão, T., Peres, E., & Magalhães, L. (Jun. 2012). MOW: Augmented Reality game to learn words in different languages: Case study: Learning English names of animals in elementary school. In Information Systems and Technologies (CISTI), 2012 7th Iberian Conference on (pp. 1-6). IEEE.

Baylor, A. L., & Ryu, J. (2003). The effects of image and animation in enhancing pedagogical agent persona. Journal of Educational Computing Research, 28(4), 373-394.

Beck, I. L., McKeown, M. G., & Kucan, L. (2013). Bringing words to life: Robust vocabulary instruction. Guilford Press.

Biemiller, Andrew, and Catherine Boote. "An effective method for building meaning vocabulary in primary grades." Journal of educational psychology 98.1 (2006): 44.

Carlo, M. S., August, D., McLaughlin, B., Snow, C., Dressler, C., Lippman, D., . . . & White, C. E. (2009). Closing the gap: Addressing the vocabulary needs of English-language learners in bilingual and mainstream classrooms. Journal of Education, 189(1-2), 57-76.

Cascales, A., Laguna, I., Pérez-López, D., Perona, P., & Contero, M. (Jul. 2013). An experience on natural sciences augmented reality contents for preschoolers. In International Conference on Virtual, Augmented and Mixed Reality (pp. 103-112). Springer, Berlin, Heidelberg.

Chapman, C., Laird, J., & Kewal Ramani, A. (2011). Trends in high school dropout and completion rates in the United States: 1972-2009 (NCES 2012-006). Washington, DC: National Center for Educational Statistics. Retrieved from http://nces.ed.gov/pubsearch.

Chiang, T. H., Yang, S. J., & Hwang, G. J. (2014). An augmented reality-based mobile learning system to improve students' learning achievements and motivations in natural science inquiry activities. Journal of Educational Technology & Society, 17(4), 352.

Clark, J. M., & Paivio, A. (1991). Dual coding theory and education. Educational psychology review, 3(3), 149-210.

Di Serio, Á., Ibáñez, M. B., & Kloos, C. D. (2013). Impact of an augmented reality system on students' motivation for a visual art course. Computers & Education, 68, 586-596.

Dunleavy, M. (2014). Design principles for augmented reality learning. TechTrends, 58(1), 28-34.

Ferrer-Torregrosa, J., Torralba, J., Jimenez, M. A., García, S., & Barcia, J. M. (2015). ARBOOK: development and assessment of a tool based on augmented reality for anatomy. Journal of Science Education and Technology, 24(1), 119-124.

Hagan, E. C. (2010). Response to intervention: Implications for Spanish-speaking English language learners. Perspectives on Language and Literacy, 36(2), 24.

Han, J., Jo, M., Hyun, E., & So, H. J. (2015). Examining young children's perception toward augmented reality-infused dramatic play. Educational Technology Research and Development, 63(3), 455-474.

Karemaker, A., Jelley, F., Clancy, C., & Sylva, K. (2017). The effects on children's literacy skills of reading e-books with different features: Are 'bells and whistles' over-rated? International Journal of Child-Computer Interaction, 12, 30-36.

Küçük, S., Yilmaz, R., & Göktas, Y. (2014). Augmented reality for learning English: achievement, attitude and cognitive load levels of students. Egitim ve Bilim, 39(176).

Liu, P. H. E., & Tsai, M. K. (2013). Using augmented-reality-based mobile learning material in EFL English composition: An exploratory case study. British Journal of Educational Technology, 44(1), E1-4.

Lu, S. J., & Liu, Y. C. (2015). Integrating augmented reality technology to enhance children's learning in marine education. Environmental Education Research, 21(4), 525-541.

Maynard, B. R., Salas-Wright, C. P., & Vaughn, M. G. (2015). High school dropouts in emerging adulthood: Substance use, mental health problems, and crime. Community mental health journal, 51(3), 289-299.

McKeown, Margaret G., et al. Some effects of the nature and frequency of vocabulary instruction on the knowledge and use of words. Reading Research Quarterly (1985): 522-535.

National Assessment of Educational Progress (2010). The Nation's Report Card: Reading 2009. Retrieved from https://nces.ed.gov/pubsreach/pubsinfo.asp?pubid=2010.

National Center for Education Statistics (2015). The condition of education 2015 (NCES 2015-144). Department of Education, National Center for Education Statistics. Retrieved from https://nces.ed.gov/pubsearch/pubsinfo.asp?pubid=2015144.

Park, M., Zong, J. & Batalova, J. (2018). Growing Superdiversity among young U.S. Dual Language Learners and its Implications. Washington, DC: Migration Policy Institute.

Park, S. (2015). The Effects of Social Cue Principles on Cognitive Load, Situational Interest, Motivation, and Achievement in Pedagogical Agent Multimedia Learning. Educational Technology & Society, 18 (4), 211-229.

Park, S. (2018). Virtual Pedagogical Agents for English Language Teaching and Learning. The TESOL Encyclopedia of English Language Teaching.

Rouse, C. E. (2007). Quantifying the costs of inadequate education: Consequences of the labor market. In C. R. Belfield & H. M. Levin (Eds.), The price we pay: Economic and social consequences of inadequate education (pp. 99-124). Washington, DC: Brookings Institution Press.

Rumberger, R. W. (2006). Tenth Grade Dropout Rates by Native Language, Race/Ethnicity, and Socioeconomic Status, University of California, Linguistic Minority Research Institute EL Facts N. 7. Retrieved from http://www.lmri.ucsb.edu/publications/ (accessed Mar. 11, 2018).

Rumberger, R. W. (2011). High school dropouts in the United States. In School dropout and completion (pp. 275-294). Springer, Dordrecht. Abstract.

Silva, M., Roberto, R., & Teichrieb, V. (2013). Evaluating an educational system based on projective augmented reality. Brazilian Symposium on Computers in Education, 24(1), 214-223.

Yoon, S. A., & Wang, J. (2014). Making the invisible visible in science museums through augmented reality devices. TechTrends, 58(1), 49-55.

\* cited by examiner

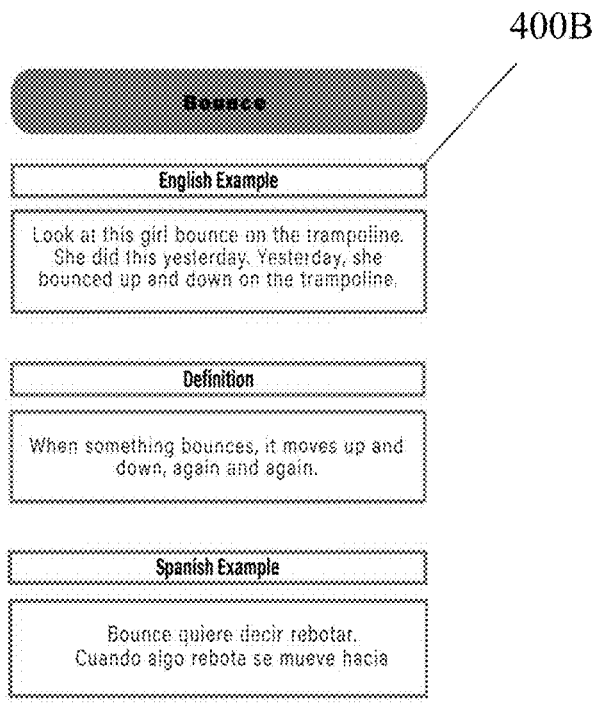
FIG. 4A         FIG. 4B
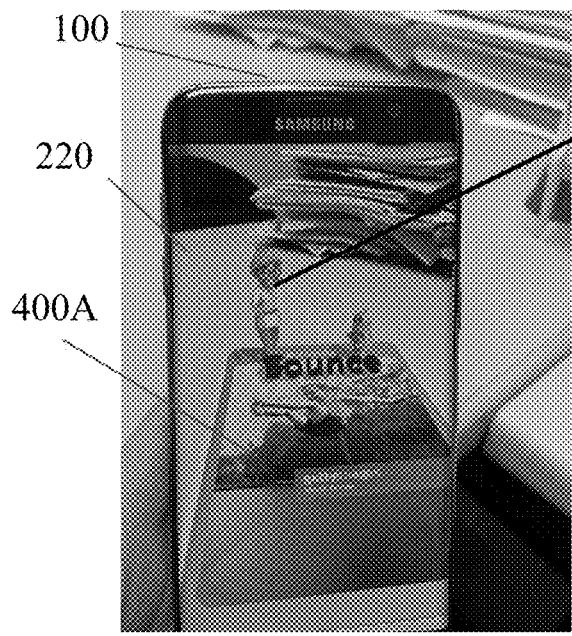
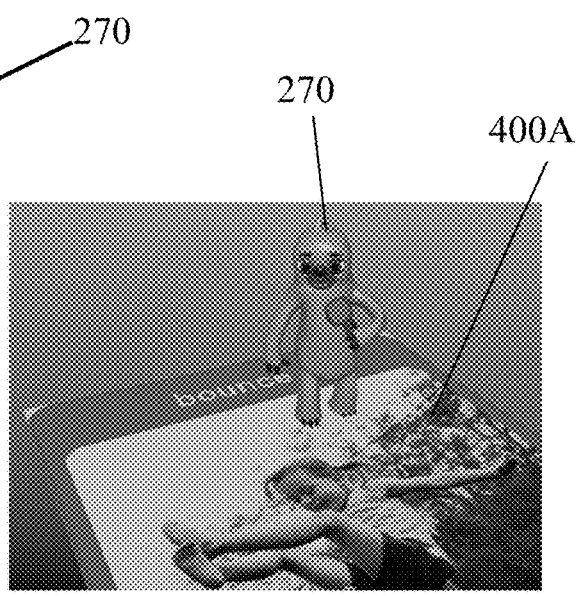
FIG. 4C         FIG. 4D

SYSTEM OF LANGUAGE LEARNING WITH AUGMENTED REALITY

CROSS REFERENCE TO RELATED APPLICATIONS

This application incorporates by reference and claims priority to U.S. Provisional Patent Application Ser. No. 62/822,125, entitled More than Words: Augmented Reality Vocabulary Instruction for English Language Learners, filed on Mar. 22, 2019.

FIELD OF THE INVENTION

The system and method disclosed herein relate to using augmented reality computer systems to provide interactive experiences for language learners that reinforce vocabulary and reading skills.

BACKGROUND

Modern educational systems have developed computerized machinery and associated methods by which individuals can perform numerous interactive learning techniques electronically. Online and virtual instruction are common tools in the modern school environment, yet even these advancements fail to address deficits that students face when they have been speaking a first or native language for long periods of time and then have to learn a new language that is fully immersed into their classroom situation.

Nearly one third of U.S. children ages 0-8 have one or more parents who speak a language other than English in the home (Park, Zong & Batalova, 2018). Children who speak a language other than English at home persistently lag behind monolingual English-speaking peers in reading and math in 4th, 8th and 10th grades (NAEP, 2010; NOES, 2015), yet the majority were born and schooled in the U.S. (Park, Zong & Batalova, 2018). Early achievement gaps have long-term consequences for individuals and society.

Insufficient vocabulary knowledge is a well-documented contributor to English language learners (ELLs) having academic difficulties (August & Shanahan, 2006; Carlo et al., 2009; NAEP, 2010). Monolingual English speakers enter school with an estimated 5,000 to 7,000 words, while ELLs begin with 3,000 to 6,000 English words, or, in some cases, as few as zero (Carlo et al., 2009). As schooling progresses, vocabulary demands escalate and school texts become progressively complex; ELLs who lag behind in vocabulary are increasingly unable to comprehend grade-level material (Carlo et al., 2009; Durgunoglu & Goldenberg, 2010). Insufficient vocabulary knowledge constrains reading comprehension and stymies the process of learning new words from reading (Carlo et al., 2009). As such, there is pressing need for pedagogical innovations in ELL vocabulary instruction to help narrow current achievement gaps.

Linguistic diversity is predicted to increase with shifting migration trends (decreasing from Mexico, increasing from Africa, Asia; Park, Zong & Batalova, 2018). Nearly one third of U.S. children ages 0-8 have one or more parents who speak a language other than English in the home (Park, Zong & Batalova, 2018). Children who speak a language other than English at home persistently lag behind monolingual English-speaking peers in reading and math in 4th, 8th and 10th grades (NAEP, 2010; NCES, 2015), yet the majority were born and schooled in the U.S. (Park, Zong & Batalova, 2018). Early achievement gaps have long-term consequences for individuals and society.

Research indicates that children need 12 or more exposures to a novel word, ideally accompanied by robust supporting information, to acquire full use of the word in their vocabulary (Biemiller and Boote (2006); McKeown, Beck, Omanson, and Pople, (1985) note in their work that this number can be prohibitively high for ELLs exposed to English primarily only during school.

Augmented Reality. Augmented Reality (AR) refers to a viewing system (commonly, a mobile device camera lens) that superimposes virtual 3D objects over the viewer's view of the surrounding world, creating the illusion of virtual objects in the viewer's environment. AR rendered "objects . . . appear to coexist in the same space as the real world," creating an immersive, real-time, interactive experience that enhances the user's understanding of the world (Azuma et al., 2001, p. 34). "Target-based AR" allows users to point a mobile device camera lens at a designated "target," a specific image such as a QR code (square barcodes readable by smartphones), to view aligned virtual content (e.g. audio, video, graphics; Dunleavy, 2014).

AR is uniquely situated to enhance learning by offering many forms of multimedia content, possibilities for differentiation, and easy alignment with existing materials, such as books. AR creates participatory experiences in which learners construct knowledge, interact with real and virtual others, and interpret meaning; characteristics emphasized in theoretical learning models (i.e. situated learning theory, constructivist learning theory; Dunleavy & Dede, 2014). An emerging body of educational research among children indicates that AR has the ability to increase motivation and enjoyment (Cascales et al., 2013; Lu & Liu, 2015; Di Serio et al., 2012) and learning outcomes (Chiang et al., 2014; Yoon & Wang, 2014). Additionally, AR's learner-driven features increase feelings of ownership and self-learning (Ferrer-Torregrosa et al., 2015). AR has been demonstrated to support early literacy development (Silva et al., 2013) and has been used as early as preschool (Han et al., 2015; Cascales et al., 2013). AR can also support the delivery of content in a child's first language when teachers lack the language proficiency to do so.

Augmented reality systems offer the use of a pedagogical agent (PA), an animated character who supports learning by engaging with the user, that can increase motivation and learning (Park, 2015). PAs deliver instructions, encouragement, and demonstrate concepts (Park, 2015). Research indicates that PAs improve motivation, attitude (Atkinson, 2002, Baylor & Ryu, 2003), and support e-book reading comprehension for children (Karemaker et al., 2017).

As noted, augmented reality offers many features relevant to language learning, yet comparatively little research has examined augmented reality for vocabulary. According to Clark & Paivio's (1991) dual coding theory, images and words are processed separately by memory; therefore, simultaneous utilization of both results in greater retention. Augmented reality goes beyond traditional instruction by presenting digital media, such as spoken definitions, expanded descriptions, sounds, multiple pictures, 3D animations, videos, and/or print. Among children, reading e-books with dictionaries containing multimedia meanings and audio cues support word recognition skills better than "flat" dictionaries (Karemaker et al., 2017). Developing AR literature on English as foreign language indicates that AR increases vocabulary learning among children (Barreira et al., 2012), decreases cognitive load and improves attitude among children (Kü ç cük, Yilmaz, & Göktas, 2014), and improves comprehension among adults (Liu & Tsai, 2013).

Augmented Reality for ELLs. AR is particularly suited to address specific challenges intrinsic to the ELL context, including: providing robust support in the first language (L1), ensuring novel words are encountered a sufficient number of times, with optimal semantic support, and instruction differentiation for increasingly diverse classrooms. ELLs learn new English words best when provided supporting materials in the first language (Carlo et al., 2009). Providing first language content in many classrooms can be challenging, however, as teachers are rarely proficient in all students' first languages.

A need exists for new computerized systems that take advantage of augmented reality platforms to increase efficiencies when teaching students that are fully immersed into a new language at school.

BRIEF SUMMARY OF THE EMBODIMENTS OF THE DISCLOSURE

In one embodiment, a computerized system of teaching utilizes curriculum materials having encoded indicia thereon. The system includes a computer having computerized memory and a processor executing imaging software and decoding software in the memory. A camera includes an image reader assembly configured to generate pixel data from the encoded indicia on a respective curriculum material, wherein the imaging software processes the pixel data to generate digital pixel data and stores the digital pixel data in the memory, wherein the processor executes decoding software by receiving the digital pixel data from the memory and generates a data set from the encoded indicia. A transceiver is in bi-directional communication with the computer and a server on a network, and the server has access to augmented reality image data. The transceiver transmits the data set to the server over the network, and the server is configured to receive the data set and transmit, to the computer, selected augmented reality image data that corresponds to the data set. The computer uses the processor to show the augmented reality image data on a display.

In another embodiment, a computer program product includes a set of computer instructions stored on non-transitory computer readable media housed in a computer, and the instructions are configured to be executed by a processor to implement a decoding process in regard to an image of an encoded indicia on a curriculum material. The computer instructions include an imaging module that (i) activates a camera in the computer to capture an image of the encoded indicia, (ii) generates a set of digital pixel data corresponding to said encoded indicia, and (iii) stores said digital pixel data in addressed memory locations in the computer. A decoding module processes at least a portion of the digital pixel data to generate a data set corresponding to a respective portion of digital pixel data stored in memory. A transmission module is configured to execute a data transmission via a network in communication with the computer, the data transmission sending the data set to a remote server that identifies corresponding augmented reality image data requested by the data set. A second set of computer instructions stored on the non-transitory computer readable media and executable by the processor receive via the network the augmented reality image data from the remote server and display the augmented reality image data on the computer.

BRIEF DESCRIPTION OF THE DRAWINGS

FIG. 4A is a front side view of curriculum material in the form of a third vocabulary flash card having an encoded indicia thereon as disclosed herein.

FIG. 4B is a rear side view of the third vocabulary flash card of FIG. 4A.

FIG. 4C is an environmental view of the third vocabulary flash card of FIG. 4A that has been used to activate an augmented reality view of the flash card on a computer display as disclosed herein.

FIG. 4D is an environmental view of the third vocabulary flash card of FIG. 4A that has been used to activate a virtual projection of an augmented reality three dimensional pedagogical agent thereon as disclosed herein.

DETAILED DESCRIPTION

The terms of this detailed description are intended to have their broadest plain meaning. For example, "software" includes, without limitation, instructions, whether in source code or compiled versions and whether activated by processors, firmware, or other hardware so long as the computerized electronics have the physical parameters that enable actions taken in accordance with the logic of the instructions. "Computer readable media" that implement "computerized methods" also encompass tangible hardware such as data storage media, or communication media including any medium that facilitates sharing data within a system. Computer-readable media generally include tangible computer-readable storage media which are non-transitory in their use of electronic signals or waves that are useful in connection with the media. Terms such as non-transitory media are used to recite various computer readable media without relying upon the transitory nature of physical signals. Computer-readable storage media can comprise RAM, ROM, EEPROM, flash memory, or any other medium that can be used to store desired program code in the form of instructions or data structures and that can be accessed and used by a computer.

The term "network" encompasses all forms of data communications traversing an infrastructure designed to share electronic data between at least two devices. Networks often encompass user devices, both wireless and wired, as well as gateways, servers, wireless transceivers, and similar hardware that establish a communications protocol allowing nodes on a network to share information of all kinds. One non-limiting example of a network is the commonly used internet infrastructure.

Figure 1:
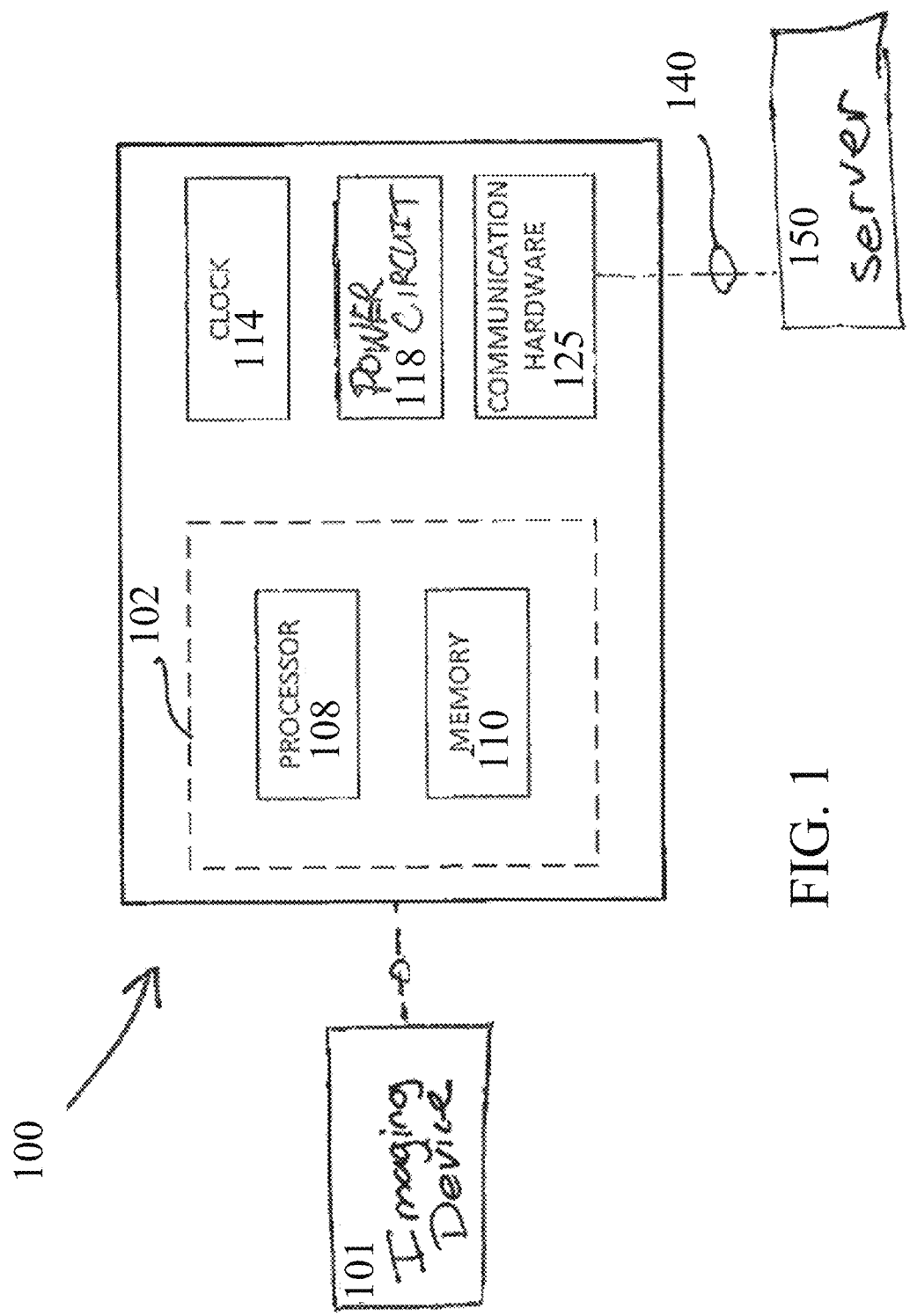
FIG. 1 is a schematic view of an exemplary computer system operating on a network as described herein.

FIG. 1 outlines a brief synopsis of a system and method by which The technology for the system, apparatus, and method of this disclosure includes computerized devices 100, such as smart phones, tablets, personal computers and the like, which are equipped with cameras and imaging devices 101 capable of transmitting receiving and transmitting image data. The term "image data" is given its broadest meaning in this disclosure to include all data associated with augmented reality systems, including but not limited to, video data, audio data, and associated telecommunications data necessary to accomplish the augmented reality images of this disclosure. In one non-limiting embodiment, an imaging device 101 may be a camera connected to a smart device, such as a smart phone or other portable communications computer. The computer used in this disclosure includes all of the technology and hardware that would be expected in modern computing and certainly sufficient to process image data. The computer of FIG. 1 includes a processor 108, memory 110, a clock 114, a power circuit 118, and communications hardware 125 that is connected to a network 140. A server 850 is also connected to the network and provides augmented reality image data back to the computer.

To add to the efficiency of learning systems described herein, one system herein incorporates the option of using encoded indicia that can securely incorporate numerous kinds of identifying data about a vocabulary word that is a planned part of a student's reading assignment. Encoded indicia, as used herein, include but are not limited to bar codes, QR codes, or any kind of printed symbols that relay data in a format that requires decoding to retrieve underlying data from the indicia. In one embodiment, the encoded indicia are printed directly onto a student's curriculum materials, such as vocabulary flash cards that are provided with reading assignments. The system and method also encompass the option of utilizing printed symbols, letters, numbers and/or other images that are not encoded but are simply read or translated into a digital format by appropriate software on a computer.

The encoded indicia of this disclosure are examples of computerized tools allowing students and teachers to access augmented reality instruction for educational purposes. Children who speak a language other than English at home often enter school with lower English proficiency, which hinders their ability to meet grade-level reading expectations and ultimately puts them at risk for academic difficulties (Carlo et al., 2009; NAEP, 2010; NCES, 2015). Augmented Reality (AR), a system that creates the illusion of virtual objects in the viewer's real surrounding environment by superimposing multimedia over the real view, offers unique possibilities for delivering engaging, differentiated, robust vocabulary instruction for English Language Learners (ELLs). This disclosure shows an AR prototype to accompany a known and existing curriculum, such as but not limited to the Developing Talkers (DT) curriculum, a research-based program for increasing students' academic language skills using repeated shared book reading (SBR) and vocabulary picture cards with explicit instruction. The proposed AR application adds robust supporting multimedia content to vocabulary picture card instruction. Using iterative design methodology, the current study employs a cyclical process of creation, evaluation, and improvement with child participants to demonstrate proof-of-concept, cost, and child acceptance. AR is potentially transformative for vocabulary instruction; the proposed study would represent a major contribution to the field and establish new cross-disciplinary and cross- institutional relationships.

AR, in conjunction with curriculum (flashcards, books), can increase word exposure and provide rich support for challenging, abstract, or complex concept words. Target-based AR is adaptable and offers opportunities for fine-grained differentiation. Materials can simultaneously offer multiple "settings" through targets that present material differentiated by English skill, first language, learning goals, setting (home, school), and/or users (solo, with parent, with teacher). Adding AR to existing pedagogical materials creates home learning modes that do not rely on parent English proficiency. Teachers can direct children to appropriate targets for robust, individualized instruction from a PA at school or home, ameliorating pressures related to limited class time and large class sizes.

In one embodiment, a computerized system of teaching utilizes curriculum materials having encoded indicia thereon. The system includes a computer having computerized memory and a processor executing imaging software and decoding software in the memory. A camera includes an image reader assembly configured to generate pixel data from the encoded indicia on a respective curriculum material, wherein the imaging software processes the pixel data to generate digital pixel data and stores the digital pixel data in the memory, wherein the processor executes decoding software by receiving the digital pixel data from the memory and generates a data set from the encoded indicia. A transceiver is in bi-directional communication with the computer and a server on a network, and the server has access to augmented reality image data. The transceiver transmits the data set to the server over the network, and the server is configured to receive the data set and transmit, to the computer, selected augmented reality image data that corresponds to the data set. The computer uses the processor to show the augmented reality image data on a display.

The computerized system of this disclosure may be used with a projector to show the augmented reality image data, such as an active pedagogical character, in three dimensional space around the user, such as the PA standing on a flash card in FIG. 4D. In all cases, the augmented reality image data may include still images, video data, audio data and all necessary telecommunications data for a synchronized presentation of augmented reality instruction on the user computer or projector. The user, such as a student, will see the augmented reality instruction materials incorporated like a video or cartoon playing atop and in conjunction with the student's real environment. Computers used in conjunction with this disclosure may be equipped with interactive equipment that allows the student to participate in exercises within an augmented reality framework. For example, the student may use a graphical user interface, a mouse, a keyboard, and/or a microphone to participate in the instruction presented by a pedagogical agent in the augmented reality view.

Figure 2A:
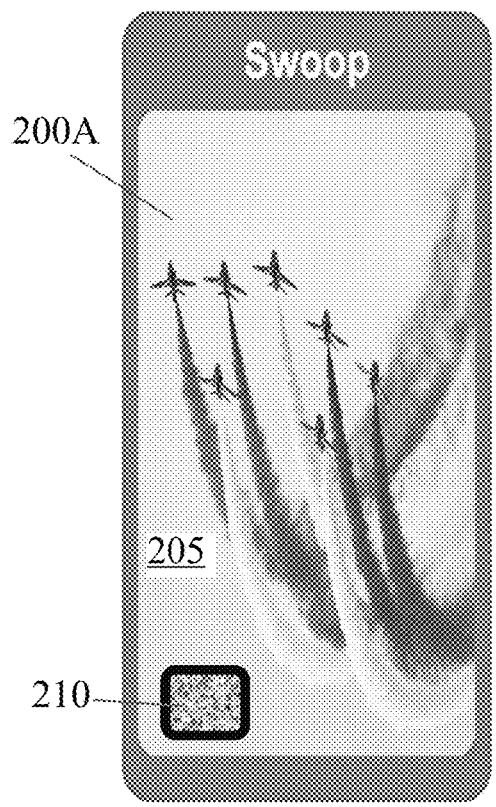
FIG. 2A is a front side view of curriculum material in the form of a first vocabulary flash card having an encoded indicia thereon as disclosed herein.
Figure 2B:
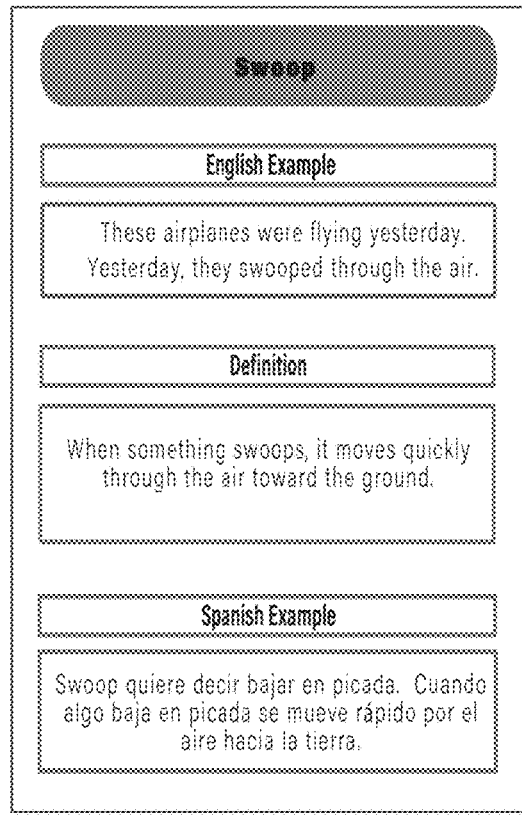
FIG. 2B is a rear side view of the first vocabulary flash card of FIG. 2A.
Figure 2C:
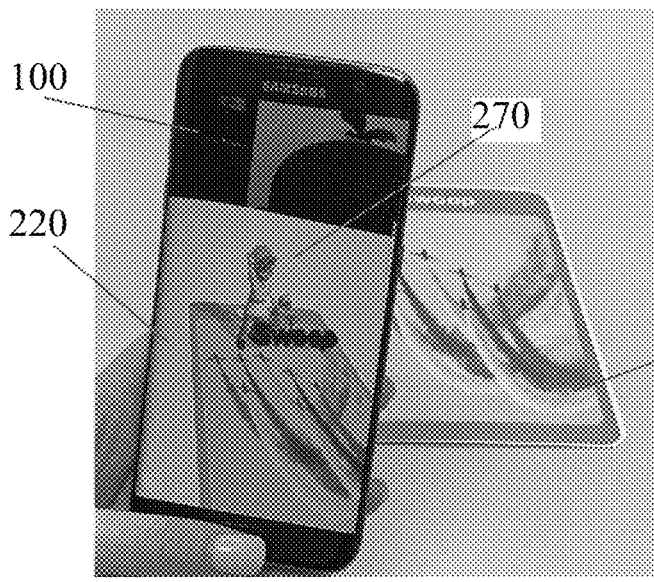
FIG. 2C is an environmental view of the first vocabulary flash card of FIG. 2A that has been used to activate an augmented reality view of the first vocabulary flash card on a computer as disclosed herein.
Figure 3A:
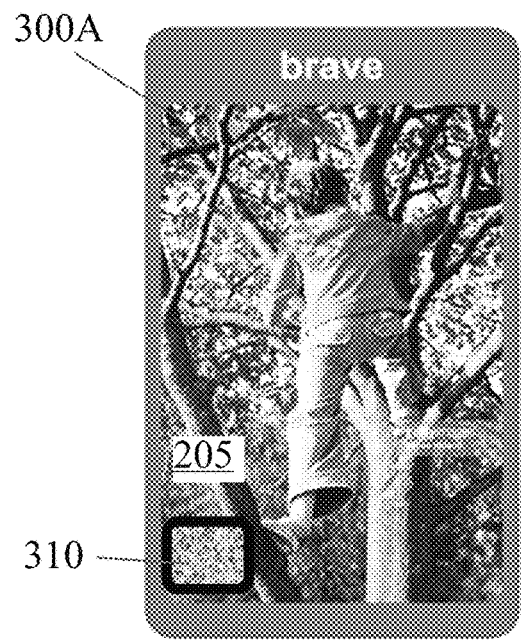
FIG. 3A is a front side view of curriculum material in the form of a second vocabulary flash card having an encoded indicia thereon as disclosed herein.
Figure 3B:
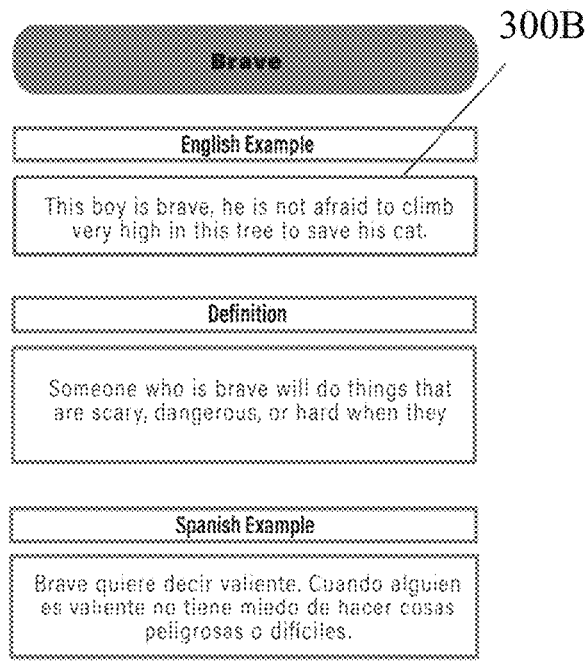
FIG. 3B is a rear side view of the second vocabulary flash card of FIG. 3A.
Figure 3C:
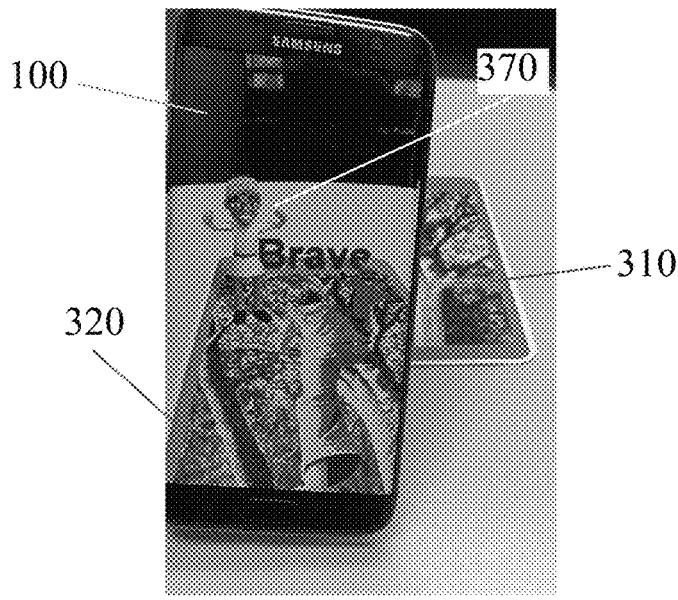
FIG. 3C is an environmental view of the second vocabulary flash card of FIG. 3A that has been used to activate an augmented reality view of the second vocabulary flash card on a computer as disclosed herein.

In certain non-limiting embodiments, the concepts herein are used in conjunction with other written materials, whether accessed by hard copies or software. The examples of FIGS. 2-4 illustrate certain ways to access and use the augmented reality system with hard copy written materials, but the examples are not limiting. In the Figures, a certain component of the curriculum materials, such as vocabulary word flash cards 200A, 300A, 400A bear an encoded indicia 210, 310, 410 on at least one side of the vocabulary word flash card. An imaging device 101 connected to or part of a computer 100 can be used to scan the encoded indicia to implement the augmented reality system described herein. One goal is to supplement information printed on the flash card, such as the photo image 205A, 305A, 405A on a first side of the flash cards and the instructional text 205B, 305B, 405B located on a second side of the flash cards. The flash cards, therefore provide written instructions, photo support, and access to augmented reality instruction through the encoded indicia 210, 310, 410.

As briefly described above and illustrated in FIGS. 2, 3, and 4, a camera or other imaging device 101 used by a student, teacher or parent, includes an image reader assembly configured to generate pixel data from the encoded indicia 210, 310, 410 on a respective curriculum material, such as one of the vocabulary word flash cards 200, 300, 400. The imaging software processes the pixel data to generate digital pixel data and stores the digital pixel data in the memory 110, wherein the processor executes decoding software by receiving the digital pixel data from the memory and generates a data set from the encoded indicia 210, 310, 410. A transceiver is in bi-directional communication with the computer 100 and a server 150 on a network 140, and the server has access to augmented reality image data. The augmented reality image data may be stored in a database or in the cloud as provided by numerous content providers. The transceiver transmits the data set to the server 150 over the network 140, and the server is configured to receive the data set and transmit, to the computer, selected augmented reality image data that corresponds to the data set. The computer 100 uses the processor to show the augmented reality image data on a display 220, 320, 420.

In certain non-limiting embodiments, the encoded indicia is a QR code that contains information related to identifying requested augmented reality image data from the server 150 over the network 140. By scanning the QR code, the computer 100 uses its decoding software to create a data set for transmitting to the server. The data set may include an identifier for selected augmented reality image data associated with the user's curriculum, information about the curriculum at issue, the academic level of the user, and any other data necessary to ensure that the most appropriate augmented reality image data is transmitted back to the computer.

The server 150 transmits comprehensive augmented reality image data back to the computer 100 for viewing on a display accessible by a student. As noted above, part of the content may include an interactive pedagogical agent 270, 370, 470 that helps the student with a part of the instruction related to a portion of the curriculum.

In another embodiment, a computer program product includes a set of computer instructions stored on non-transitory computer readable media (e.g., memory 110) housed in a computer 100, and the instructions are configured to be executed by a processor to implement a decoding process in regard to an image of an encoded indicia 210, 310, 410 on a curriculum material 200, 300, 400. The computer instructions include an imaging module that (i) activates a camera 101 in the computer 100 to capture an image of the encoded indicia, (ii) generates a set of digital pixel data corresponding to said encoded indicia, and (iii) stores said digital pixel data in addressed memory locations in the computer. A decoding module processes at least a portion of the digital pixel data to generate a data set corresponding to a respective portion of digital pixel data stored in memory. A transmission module 125 is configured to execute a data transmission via a network 140 in communication with the computer 100, the data transmission sending the data set to a remote server 150 that identifies corresponding augmented reality image data requested by the data set. A second set of computer instructions stored on the non-transitory computer readable media and executable by the processor 108 of the computer 100 receive via the network 140 the augmented reality image data from the remote server and display the augmented reality image data on the computer.

These technical aspects of the disclosure have been implemented in the case study that follows.

Case Study

The current study proposed to develop and test a target-based augmented reality (AR) prototype to augment existing vocabulary cards that form part of an early childhood oral language and vocabulary instruction curriculum supplement known as Developing Talkers (DT). DT uses research-based practices for increasing students' academic language skills using repeated shared book reading (SBR) experiences as the cornerstone. The SBR routine includes vocabulary picture cards with teaching instructions for use before and after shared book reading, elaborations during reading, and guiding questions that became increasingly challenging. Augmented Reality (AR) multimedia content will align with existing curriculum and present users with: 1) Pedagogical Agent (PA) delivered audio of rigorously developed, child-friendly definitions and scripted explanations designed to be used by children with help from teachers and possibly parents before and after reading corresponding storybooks; 2) pictures and animations. Support explanations will be delivered by PAs Scout (a squirrel) and Luz (a Spanish speaking ladybug), characters already integrated into the Developing Talkers (DT) curriculum. AR will be added by placing QR code stickers on vocabulary cards. The proposed study has 3 aims: 1) develop an AR prototype to supplement the DT curriculum and to allow greater flexibility of use by children and adults; 2) demonstrate proof-of-concept, cost, and child acceptance; 3) conduct a learning experience analysis.

Project Activities and Outcomes.

The study used iterative design methodology, a cyclical process of creation, evaluation, and improvement. This method is commonly used for new technology applications and is effective for facilitating design improvement. First, target-based AR for a chosen curriculum was created, then it was evaluated in research sessions with child participants. Based on session findings, the app has been improved then evaluated again. The AR app underwent approximately 5 evaluation rounds with 2 participants per round.

Participants. Ten typically developing Spanish-speaking ELLs between ages 4-6 were recruited via convenience sampling, flyers, and email ListServs.

Audio recordings. Supporting audio material will be recorded in a sound-proof testing and recording booth, that has on prior occasions been made available to us by the Department of Communication Science and Disorders, and edited using Adobe Audition software.

AR App. AR materials will be created using GoAnimate software, HP Reveal app and HP Reveal studio. HP Reveal is a free service for creating AR-based learning activities, and offers easy-to-use interfaces for immersive AR experiences via iOS/Android mobile devices.

QR Targets. QR Code-based triggers will be created via QR code website. QR targets will be printed on sticker paper and placed on flashcards.

Tablets. Participants will access AR materials using Samsung Tablets supplied by Dr. Park.

Location. Research sessions will take place at the College of Behavioral and Community Sciences clinic research observation rooms, 12×12 private rooms equipped with video and audio recording, observation window, table and chairs.

Sessions. The Augmented Reality (AR) app will undergo a total of 5 evaluation rounds, each consisting of 2 individual participant sessions. The initial two rounds of evaluation will be with researcher, rounds 3-5 will include parent. During the session, participant will be presented with cards and Samsung tablet. The researcher will present the participant with 5 AR vocabulary cards, demonstrate tablet use and AR capabilities, then spend 10 minutes reviewing target cards. In evaluation rounds 3-5, parents present and review cards for 10 minutes. After 10 minutes of card work, child and researcher/parent will read an aligned storybook containing target words, then again review AR cards containing post-reading support for target words. Finally, researcher will debrief participant and parents, asking about enjoyment and memory for cards, and administer target word multiple choice test (see Child academic vocabulary measure).

Curriculum. Lessons feature trade books (half narrative and half informational genres) that are read in whole or small groups and are supported with vocabulary instruction and inferential language and comprehension instruction. Each book includes 9-12 target vocabulary words that are interactively taught with the aid of picture vocabulary cards before and after reading and verbal elaborations during reading. To select target words, curriculum focused on sophisticated words according to Beck and colleagues' criteria (2013) and sought words mastered at grade 4 or beyond in past research (Dale & O'Rourke, 1981) to ensure these were unfamiliar words worth teaching. The majority of words selected were sophisticated words (77.98% "Tier 2"; Beck et al., 2013) and estimated to be mastered at grades 4 or 6 (Dale & O'Rourke). Taught words include all parts of speech: verbs, nouns, modifiers. Each book also includes a guiding question that is presented prior to reading the book and multiple literal and inferential questions on stickers placed in the text at the point of use.

Child academic vocabulary measure. Receptive understanding of the 5 AR instruction words and 5 exposure-only words that appear in curriculum text but receive no explicit instruction. This measure is presented on a touchscreen, tablet computer. After two practice items, children listen to audio recorded instructions that tell them to "Point to the best picture for . . . (target word)" as they are presented with three photographs—one of which demonstrates the target word and two foils. Foils are selected to ensure similarity of image features unrelated to the concept tested. For example, foils maintain similarity in the age, number of subjects and of relative size, orientation and saliency of objects across the foils.

Learning experience analysis. Analysis will evaluate: 1) cognitive experience (i.e. learning gains as measured by post-test, reported perceived task difficulty); 2) emotional experience (i.e. situational interest, self-reported positive and/or negative emotions); 3) behavior experience (i.e. observed total time taken to complete each learning activity, behavioral sequence of completing a learning activity such as viewing activities, questions asked to teacher/parents during activity, AR card interaction including flipping, sorting, etc.).

Outcomes. The proposed project will develop an AR prototype that could supplement the Developing Talkers curriculum to demonstrate proof-of-concept, cost, and child acceptance through an iterative design methodology.

The following scripts were considered for the augmented reality image data viewed by subjects who interacted with the pedagogical agent (PA) as follows.

Script 1 (see FIG. 2)
PA: Swoop
Watson the Sloth: Sw-oop, swooop.
PA: Swoop starts with S
"S" is made salient
PA: Swoop
PA: These airplanes were flying yesterday. Yesterday, they swooped through the air.
"Swoop" changes to "Swooped" when PA says "Swooped"
PA: When something swoops, it moves quickly through the air toward the ground.
"Swooped" change to "Swoops" when PA says "Swoops"
Chime noise
"Swoops" changes to "Bajar en picada"
PA: Swoop quiere decir bajar en picada. Cuando algo baja en picada se mueve rápido por el aire hacia la tierra.
"Bajar en picada" changes to "Swoop"
PA: Look at me swoop my hand. Let's act out swooping, you move your hand toward the ground
PA swoops hand.

Script 2 (See FIG. 3)
PA: Brave
Watson the sloth: B-rave. Braaaave
PA: Brave starts with B
"B" is made salient
PA: Brave
PA: This boy is brave, he is not afraid to climb very high in this tree to save his cat.
PA: Someone who is brave will do things that are scary, dangerous, or hard when they need to.
Chime noise
"Brave" changes to "Valiente"
PA: Brave quiere decir valiente. Cuando alguien es valiente no tiene miedo de hacer cosas peligrosas o difíciles.
"Valiente" changes to "Brave"
PA: I'm not scared to do things that are scary or dangerous or hard when I need to, I'm brave. Let's say: I'm not scared, I'm brave!
Some form of looking brave.

Script 3 (See FIG. 4)
PA: Bounce
Watson the sloth: B-ounce. B000uunce.
PA: Bounce starts with B "B" is made salient
PA: Bounce
"Bounce" changes to "Bounced" when PA says bounced
PA: Look at this girl bounce on the trampoline. She did this yesterday. Yesterday, she bounced up and down on the trampoline.
"Bounced" changes to "Bounces" when PA says Bounces
PA: When something bounces, it moves up and down, again and again.
Chime noise
"Bounces" changes to "Rebotar"
PA: Bounce quiere decir rebotar. Cuando algo rebota se mueve hacia arriba y hacia abajo una y otra vez.
PA: I'm bouncing. Let's act out bouncing. You move up and down again and again.
"Rebotar" changes to "Bouncing," PA bounces.

Script 4
PA: Hunt
Watson the Sloth: H-unt, huunt.
PA: Hunt starts with H
"H" is made salient
PA: Hunt
PA: This cat went outside to hunt. Yesterday, she went hunting for a mouse to eat.
"Hunt" changes to "Hunting" when PA says hunting
PA: When a person or animal hunts, they go look for something to catch and eat.

"Hunting" changes to "Hunts"
Chime noise
"Hunts" changes to "Cazar"
PA: Hunt quiere decir cazar. Cuando una persona o un animal caza, salen en busca de algo que atrapar y comer.
"Cazar" changes to "Hunt"
PA: Pretend you are a cat and you are hunting for food. Say, I'm hunting for food!
PA does some hunting action.
   Script 5
PA:Wsh
Watson the Sloth: W-ish, wiiiish
PA:Wish starts with W
"W" is made salient
PA:Wish
PA:This boy made a wish on his birthday. He wished for a puppy.
PA: When you wish for something, you think about something you want to happen or come true.
Chime sound
"Wish" changes to "deseo"
PA:Wish quiere decir deseo. Cuando haces un deseo piensas en algo que quieres que ocurra o que se haga realidad.
"Deseo" changes to "Wish"
PA:Pretend it's your birthday and you are wishing for your favorite toy. Say, I'm wishing for my favorite toy!
PA does some wishing action
   Script 6
PA: Silent
Watson the sloth: S-ilent, Siiilent.
PA:Silent starts with S
"S" is made salient
PA:Silent
PA: This girl is telling us to be very quiet and not make noise. She is telling us to be silent.
PA: Someone who is silent is completely quiet and is making no sound at all
"Silent" changes to "Silencioso"
PA: Silent quiere decir silencloso. Cuando alguien es silencioso está completamente caliado y no está haciendo ningOn mid°.
"Sliencioso" changes to "Silent"
   PA: Pretend you are in a noisy room and you want everyone to be silent. Say, shhhhhh. Please be silent!
PA does a silencing action.
   Script 7
PA: Thought
Watson the Sloth: Th-ought, Thouuuught.
PA: Thought starts with T
"T" is made salient
PA: Thought.
PA: Look at this girl, she has thoughts about spaceships, stars, and the moon.
PA: A thought is an idea you have in your mind
Chime sound
"Thought" changes to "Pensamiento"
PA:Thought quiere decir pensamiento. Un pensamiento es una idea que tienes en to mente.
"Pensamiento" changes to "Thought"
PA: Pretend you are thinking. Touch your head and say, I had a thought!
PA does a thinking action.
PA: Flap
Watson the Sloth: F-lapped, fllaaappped
PA: Flap starts with F
"F" becomes salient
PA: Flap PA: Look at this bird, yesterday he flapped his wings. He moved his wings up and down very fast.
"Flap" changes to "Flapped" when PA says flapped
PA: If a bird flaps its wings, his wings move quickly up and down.
"Flapped" changes to "Flaps" when PA says flaps
Chime sound
"Flaps" changes to "Aletear"
PA: Rap quiere declr aletear. Cuando un pájaro aletea sus alas las mueve rápidamente hada arriba y hada abajo.
"Aletear" changes to "Flap"
PA: Open your arms and pretend to flap your wings like a bird. Say I'm flapping my wings!
PA does some flapping actions

The invention claimed is:

1. A computerized system of teaching that utilizes curriculum materials having encoded indicia, comprising:
   a computer comprising computerized memory and a processor executing imaging software and decoding software in said memory;
   a camera comprising an image reader assembly configured to generate pixel data from the encoded indicia on a respective curriculum material;
   wherein the imaging software processes said pixel data to generate digital pixel data and stores the digital pixel data in said memory,
   wherein said processor executes said decoding software by receiving said digital pixel data from said memory and generates a data set from the encoded indicia;
   a transceiver in bi-directional communication with the computer and a server on a network, said server having access to augmented reality image data, said transceiver transmitting said data set to said server over the network;
   wherein said server is configured to receive said data set and transmit, to the computer, selected augmented reality image data that corresponds to the data set, and
   wherein said computer uses the processor to show the augmented reality image data on a display.

2. The system according to claim 1, further comprising a projector configured to display the augmented reality image data in real world surroundings.

3. The system according to claim 1, wherein the display on the computer is configured to show the augmented reality image data in synchronized video format and audio format.

4. The system according to claim 1, further comprising a graphical user interface connected to the computer, said graphical user interface allowing a student to interact with the augmented reality image data in real time communications over the network with the server.

5. A system according to claim 1, wherein said encoded indicia is a QR code and said data set transmitted to the server comprises at least a portion of information within the indicia.

6. A system according to claim 5, wherein said data set comprises an identification number corresponding to a respective curriculum material.

7. A system according to claim 5, wherein said encoded indicia comprises vocabulary word information in addition to said data set transmitted to said server.

8. A system according to claim 1, wherein the display on the computer is configured to show the augmented reality image data in synchronized video format and audio format, wherein said audio format comprises bi-lingual content.

9. A system according to claim 8, wherein said bi-lingual content comprises augmented reality instruction in a student's first language and a second language.

10. A system according to claim 9, further comprising a graphical user interface and voice transmission software allowing a student to interact with said bi-lingual content to practice a vocabulary word explained in the bi-lingual content.

11. A system according to claim 1, wherein said curriculum material is a flash card associated with a vocabulary word, and the encoded indicia is positioned on the flash card.

12. A system according to claim 1, wherein said augmented reality image data comprises video data configured to implement a pedagogical character on the display.

13. A system according to claim 1, wherein said imaging software generating said digital pixel data stores said digital pixel data in addressed frames of data, and said data set comprises at least an addressed subset of said frames of data.

14. A system according to claim 1, wherein said computer is a mobile computer or a smart device.

* * * * *